United States Patent [19]
Tobi et al.

[11] Patent Number: 5,675,976
[45] Date of Patent: Oct. 14, 1997

[54] CONTROLLER OF AIR-CONDITIONER

[75] Inventors: Yukio Tobi; Takashi Matsuzuki, both of Ota; Tetsushi Eguchi, Ora-gun, all of Japan

[73] Assignee: Sanyo Electric Co., Limited, Osaka, Japan

[21] Appl. No.: 672,659

[22] Filed: Jun. 28, 1996

[30] Foreign Application Priority Data

Oct. 23, 1995 [JP] Japan ................... 7-274222

[51] Int. Cl.⁶ ................................................ F24F 11/02
[52] U.S. Cl. ........................... 62/180; 62/227; 62/282
[58] Field of Search ...................... 62/186, 180, 179, 62/272, 282, 227, 228.3, 228.4, 82

[56] References Cited

U.S. PATENT DOCUMENTS

| | | | |
|---|---|---|---|
| 3,115,017 | 12/1963 | Kocher et al. | 62/282 X |
| 4,208,884 | 6/1980 | Popham | 62/282 |
| 4,404,816 | 9/1983 | Ibrahim et al. | 62/282 |
| 4,895,002 | 1/1990 | Ishioka et al. | 62/180 X |
| 5,341,650 | 8/1994 | Nagasawa et al. | 62/180 |

FOREIGN PATENT DOCUMENTS

| | | |
|---|---|---|
| 2-115652 | 4/1990 | Japan . |
| 3-11253 | 1/1991 | Japan . |

*Primary Examiner*—Harry B. Tanner
*Attorney, Agent, or Firm*—Wenderoth, Lind & Ponack

[57] ABSTRACT

Freezing is prevented when either of two blow ports of a bidirectional blow air-conditioner is closed. A first blowing fan is disposed on one of the sides of a heat exchanger on the utilization side and a second blowing fan is disposed on the other side. First and second blow ports are so disposed as to correspond to these showing fans, respectively, and a flap is operable to close the first blow port. The blow quantity of the second blowing fan, when the flap closes the first blow port, is controlled to a value greater than the blow quantity of the second blowing fan when the flap does not close the first blow port.

6 Claims, 5 Drawing Sheets

CONTROLLER OF AIR-CONDITIONER

BACKGROUND OF THE INVENTION

This invention relates to a controller of an air-conditioner which has a first blow port and a second blow port for returning air air-conditioned by a heat exchanger on a utilization side to a room to be air conditioned, and a first blowing fan and a second blowing fan corresponding to these blow ports, respectively.

A conventional air-conditioner is described in Japanese Patent Laid-Open No. 2-115652/1990. This air-conditioner increases the blow quantity from a blower when both of a signal from a clogging judgment section of an air filter and a signal from a freezing judgment section are outputted, and prevents freezing of an evaporator that might occur due to clogging of the air filter and the drop of the blow quantity.

Another conventional air-conditioner is described in Japanese Patent Laid-Open No. 3-11253/1991. When the temperature of a heat exchanger for cooling on the room side drops during the operation of a cooling/refrigeration cycle, this air-conditioner heats the heat exchanger for cooling on the room side by heat radiation from a heat exchanger for heating on the room side, which is disposed adjacent to the former, and prevents freezing of the heat exchanger for cooling on the room side.

The conventional technologies for freezing described above start the protection operation only after the state that the heat exchanger might be frozen is judged or predicted.

Depending on the condition of the blow course or its design, however, there is the case where freezing of the heat exchanger (or the heat radiator) is predicted in advance during a normal continuous operation. In such a case, the function of preventing freezing is desirably operated in advance, but by the conventional technologies, the freezing prevention function becomes effective only after the condition which might bring about freezing is judged or predicted, as described above.

When, for example, blowing is conducted from only one of the blow ports (first blow port or second blow port) in an air-conditioner, which has a first blowing fan so disposed on one of the sides as to oppose the same surface of a heat exchanger on the utilization side and a second blowing fan so disposed on the other side as to oppose the heat exchanger and first and second blow ports for returning air heat-exchanged by the heat exchanger on the utilization side to a room to be air conditioned, a region or area at which the blow quantity for one of the surfaces of the heat exchanger becomes particularly small is formed due to the relationship with the air course (particularly the positions of the blowing fan), and freezing occurs at a part of the heat exchanger even though the normal operation is carried out.

According to the conventional technologies, the function of preventing freezing is not performed until a detector detects freezing prevention, even though freezing is anticipated.

SUMMARY OF THE INVENTION

An object of the present invention is to provide a new and improved controller of an air conditioner which can solve the problem encountered in the conventional air conditioner and can conduct the freezing prevention operation before the detector detects freezing prevention when freezing is anticipated.

In a first aspect of the invention in which an air-conditioner including at least a refrigeration cycle formed by connecting in a loop a compressor of a variable capacity type, a heat exchanger on the heat source side, an expansion device and a heat exchanger on the utilization side by a refrigeration piping, and a heat radiator integrally constituted on one of the surfaces of the heat exchanger on the utilization side, for circulating hot water therethrough, a controller of the air-conditioner comprises a first blowing fan so disposed on one of the sides as to oppose the same surface of the heat exchanger on the utilization side and a second blowing fan so disposed on the other side as to oppose the same surface; a first blow port and a second blow port for returning air heat-exchanged by the heat exchanger on the utilization side to a room to be air-conditioned, disposed in such a manner as to correspond to the blowing fans, respectively; a flap for closing the first blow port; and control means for increasing the blow quantity of the second blowing fan when the flap closes the blow port, to a value greater than the blow quantity of the second blowing fan when the flap does not close the first blow port, while the set blow quantity is the same; whereby this controller prevents freezing resulting from the drop of the blow quantity by increasing the blow quantity of the blowing fan.

In a second aspect of the invention in which an air-conditioner includes at least a refrigeration cycle formed by connecting in a loop a compressor of a variable capacity type, a heat exchanger on the heat source side, an expansion device and a heat exchanger on the utilization side by a refrigeration piping, and a heat radiator integrally constituted on one of the surfaces of the heat exchanger on the utilization side, for circulating hot water therethrough, a controller of the air-conditioner comprises a first blowing fan so disposed on one of the sides as to oppose the same surface of the heat exchanger on the utilizing side and a second blowing fan so disposed on the other side as to oppose the same surface; a first blow port and a second blow port for returning air heat-exchanged by the heat exchanger on the utilization side to a room to be air-conditioned, disposed in such a manner as to correspond to the blowing fans, respectively; a flap for closing the first blow port; and control means comprising fan control means for controlling the blow quantity of the second blowing fan when the flap closes the first blow port, to a value greater than the blow quantity of the second blowing fan when the flap does not close the first blow port, while the set blow quantity is the same, and capacity regulation means for reducing the capacity of the compressor when the temperature of the heat radiator falls below a predetermined temperature; whereby this controller prevents freezing due to the drop of the blow quantity by increasing the blow quantity of the blowing fan, and prevents freezing by lowering the operation capacity of the compressor when the temperature of the heat radiator drops.

In a third aspect of the invention in which an air-conditioner including at least a refrigeration cycle formed by connecting in a loop a compressor of a variable capacity type, a heat exchanger on the heat source side, an expansion device and a heat exchanger on the utilization side by a refrigeration piping, and a heat radiator integrally constituted on one of the surfaces of the heat exchanger on the utilization side, for circulating hot water therethrough, a controller of the air-conditioner comprises a first blowing fan so disposed on one of the sides as to oppose the same surface of the heat exchanger on the utilization side and a second blowing fan so disposed on the other side as to oppose the same surface; a first blow port and a second blow port for returning air heat-exchanged by the heat exchanger on the utilization side to a room to be air-conditioned, disposed in such a manner as to correspond to the blowing fans, respectively; a flap for closing the first blow port; and control means comprising fan control means for controlling the blow quantity of the second blowing fan when the flap closes the first blow port, to a value greater than the blow quantity of the second blowing fan when the flap does not close the first blow port, while the set blow quantity is the same, capacity regulation means for reducing the capacity of the compressor when the temperature of the heat radiator falls below a predetermined temperature, and hot water control means for controlling the flow of hot water in a direction in which the temperature of the heat radiator rises, when the temperature of the heat radiator falls below a second temperature lower than a predetermined first temperature; whereby, this controller prevents freezing resulting from the drop of the blow quantity by increasing the blow quantity of the blowing fan, prevents freezing when the temperature of the heat radiator drops, by lowering the operation capacity of the compressor, and prevents freezing by permitting hot water to flow through the heat radiator when the temperature of the heat radiator further drops.

In a fourth aspect of the invention in which an air-conditioner including at least a refrigeration cycle formed by connecting in a loop a compressor of a variable capacity type, a heat exchanger on the heat source side, an expansion device and a heat exchanger on the utilization side by a refrigeration piping, a controller of the air-conditioner comprises a first blowing fan so disposed on one of the sides as to oppose the same surface of the heat exchanger on the utilization side and a second blowing fan so disposed on the other side as to oppose the same surface; a first blow port and a second blow port for returning air heat-exchanged by the heat exchanger on the utilization side to a room to be air-conditioned, disposed in such a manner as to correspond to the blowing fans, respectively; a flap for closing the first blow port; and control means for controlling the blow quantity of the second blowing fan when the flap closes the first blow port, to a value greater than the blow quantity of the second blowing fan when the flap does not close the first blow port, while the set blow quantity is the same; whereby this controller prevents freezing resulting from the drop of the blow quantity by increasing the blow quantity of the blowing fan.

In a fifth aspect of the invention in which an air-conditioner including at least a refrigeration cycle formed by connecting in a loop a compressor of a variable capacity type, a heat exchanger on the heat source side, an expansion device and a heat exchanger on the utilization side by a refrigeration piping, a controller of the air-conditioner comprises a first blowing fan so disposed on one of the sides as to oppose the same surface of the heat exchanger on the utilization side and a second blowing fan so disposed on the other side as to oppose the same surface; a first blow port and a second blow port for returning air heat-exchanged by the heat exchanger on the utilization side to a room to be air-conditioned, disposed in such a manner as to correspond to the blowing fans, respectively; a flap for closing the first blow port; and control means comprising fan control means for controlling the blow quantity of the second blowing fan when the flap closes the first blow port, to a value greater than the blow quantity of the second blowing fan when the flap does not close the first blow port, while the set blow quantity is the same, and capacity regulation means for reducing the capacity of the compressor when the temperature of the heat exchanger on the utilization side falls below a predetermined temperature; whereby this controller prevents freezing resulting from the drop of the blow quantity by increasing the blow quantity of the blowing fan, and prevents freezing when the temperature of the heat radiator drops, by lowering the operation capacity of the compressor.

In a sixth aspect of the invention in which an air-conditioner including at least a refrigeration cycle formed by connecting in a loop a compressor of a variable capacity type, a heat exchanger on the heat source side, an expansion device and a heat exchanger on the utilization side by a refrigeration piping, a controller of the air-conditioner comprises a first fan so disposed on one of the sides as to oppose the same surface of the heat exchanger on the utilization side and a second blowing fan so disposed on the other side as to oppose the same surface; a first blow port and a second blow port for returning air heat-exchanged by the heat exchanger on the utilization side to a room to be air-conditioned, disposed in such a manner as to correspond to the blowing fans, respectively; and control means comprising fan control means for controlling the blow quantity of the second blowing fan when the first blowing fan does not operate, to a value greater than the blow quantity of the second blowing fan when the first blowing fan operates, while the set blow quantity is the same, and capacity regulation means for reducing the capacity of the compressor when the temperature of the heat exchanger on the utilization side falls below a predetermined temperature; whereby this controller prevents freezing resulting from the drop of the blow quantity by increasing the blow quantity of the blowing fan.

PREFERRED EMBODIMENTS OF THE INVENTION

Figure 1:
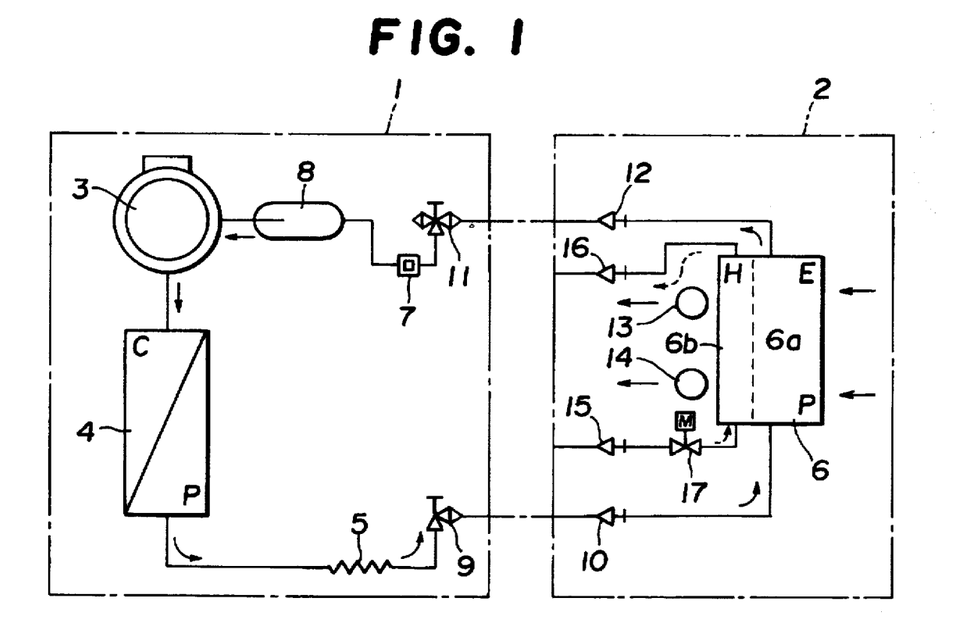
FIG. 1 is a refrigeration circuit diagram showing a refrigeration cycle of an air-conditioner using the present invention.

Hereinafter, an embodiment of the present invention will be explained with reference to the drawings. FIG. 1 is a refrigeration circuit diagram and shows a refrigeration cycle of an air conditioner using the present invention. In the drawing, reference numerals 1 and 2 denote an outdoor unit and an room unit, respectively, and devices that constitute the refrigeration cycle are mounted dividedly to both of these units.

A compressor of a variable capacity type, a heat exchanger on the heat source side, an expansion device 5 (capillary tube), a muffler 7 and an accumulator 8 are mounted to the outdoor unit 1 while a heat exchanger 6 on the utilization side is mounted to the room unit 2, and the compressor 3, the heat exchanger 4 on the heat source side, the expansion device 5, the heat exchanger 6 on the utilization side, the muffler 7 and the accumulator 8 are connected in a loop in the order mentioned by refrigeration piping and constitute the refrigeration cycle.

A service valve 9 on the capillary tube side and a nipple 10 on the capillary side, are connected by a refrigeration piping (thin pipe having a diameter φ of 6.35) that connects the outdoor unit 1 and the room unit 2. A service valve 11 on the large pipe side and a nipple 12 on the large pipe side are connected by a refrigeration piping (large pipe having a diameter φ of 9.25) that connects the outdoor unit 1 and the room unit 2.

When an induction motor is used for a driving source of the compressor 3, an inverter, etc, is used as the capacity varying means of the compressor 3 and changes the number of revolutions of the compressor by controlling the frequency of A.C. power supplied to the induction motor. When a D.C. motor is used for the driving source of the compressor, the number of revolutions of the compressor is changed by controlling artificially the voltage by chopping the D.C. power supplied to the D.C. motor. Furthermore, the discharge quantity of the compressor may be directly changed by disposing a capacity control valve in the compressor.

An electric expansion valve may be used in place of the capillary tube as the expansion device 5 so that the expansion quantity can be adjusted in accordance with the operation capacity of the compressor 3.

The heat exchanger 6 on the utilization side comprises an evaporator 6a through which the refrigerant flows and which functions as an evaporator, and a heat radiator 6b through which hot water flows. A first blowing fan 13 (cross-flow fan) and a second blowing fan 14 (cross-flow fan) are provided to the heat radiator 6b of this heat exchanger 6 on the utilization side. When these blowing fans 13 and 14 are driven, air flows through the evaporator 6a and the heat radiator 6b in this order.

The heat radiator 6b is connected to a hot water supply circuit (for warming) through a hot water inlet 15 and a hot water outlet 16, and the flow rate of hot water flowing through the heat radiator 6b from the hot water circuit can be changed in accordance with the opening of a flow rate variable valve 17 inserted between the heat radiator 6b and the hot water inlet 15.

Figure 2:
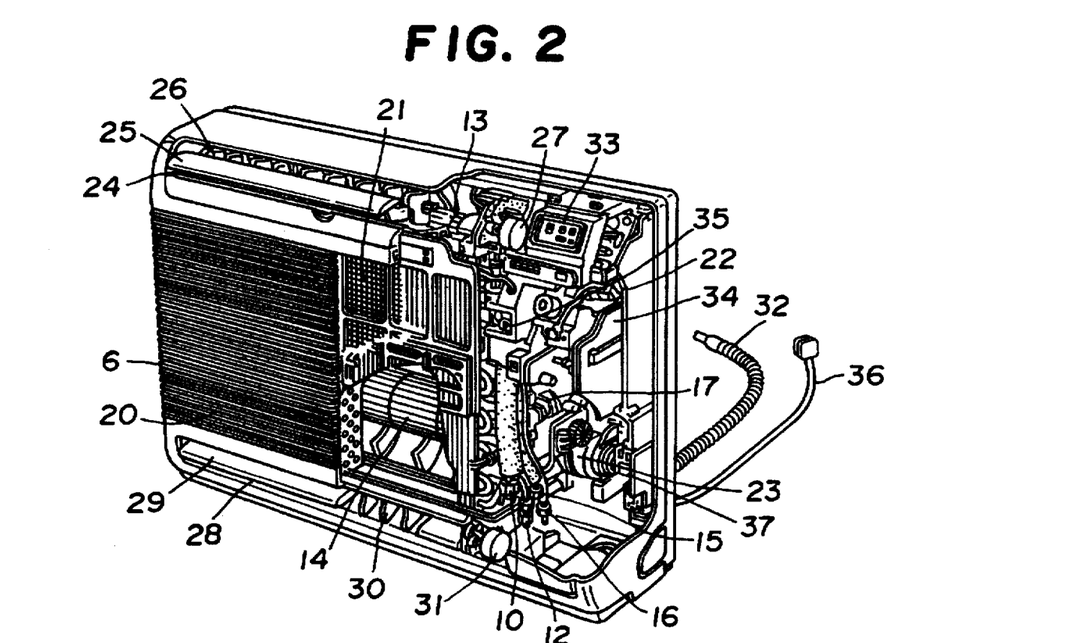
FIG. 2 is a partially exploded perspective view of a room unit shown in FIG. 1.

FIG. 2 is partial exploded perspective view of the room unit 2. In this drawing, like reference numerals are used to denote like constituent members in FIG. 1, and the explanation of such members will be omitted. A suction panel 20 is disposed on the front surface (on the side of the evaporator 6a) of the heat exchanger 6. The blowing fans 13 and 14 are disposed at the back of this heat exchanger and they are driven by the motors 22 and 23, respectively.

The fan 13 is so disposed as to oppose an upper blow port 24 and when this blowing fan 13 is driven by the fan motor 22, room air is sucked through the suction panel 20, the air filter 21 and the heat exchanger 6, in this order, then cooled, heated and dehumidified, and it is discharged into the room from the upper blow port 24.

An upper flap 25 and a flap 26 for changing the horizontal direction of discharge air are provided at upper blow port 24, and the direction of discharge air can be arbitrarily changed. The angle of the upper flap 25 can be adjusted arbitrarily/automatically by a flap motor 27 while the flap 26 can be adjusted manually. Incidentally, this upper flap 25 can close the upper blow port 24 depending on its angle.

The blowing fan 14 is so disposed as to oppose a lower blow port 28. When this blowing fan 14 is driven by the fan motor 23, room air is sucked through the suction panel 20, the air filter 21 and the heat exchanger 6 in this order, then cooled, heated and dehumidified, and discharged into the room from the lower blow port 28.

A lower flap 29 and a flap 80 for changing the horizontal direction of discharge air are provided at lower blow port 28, and the direction of discharge air can be changed arbitrarily. The angle of the lower flap 29 can be adjusted arbitrarily/automatically by a flap motor 31, and the flap 30 can be adjusted manually. Incidentally, the lower flap 29 can close the lower blow port 28 depending on its angle.

A drain hose 32 is provided for draining drain water dripping from the evaporator 66 during the cooling operation (when the refrigerant circulates through the evaporator 6a of the heat exchanger 6) and during the dehumidification operation (when the refrigerant circulates through the evaporator 6a of the heat exchanger 6 while hot water circulates through the heat radiator 6b) to the outside through a drain pan disposed below the heat exchanger 6. Incidentally, the heating operation is carried out while hot water circulates through the heat radiator 6b of the heat exchanger 6.

An operation section 33 is disposed at the upper part of the room unit 2. A variety of switches and displays for setting start/stop, operation modes (cooling operation/dehumidification operation/heating operation), etc, of the air-conditioning operation, setting of a desired room temperature, etc, are disposed on this operation section 33. Setting through this operation section 33 is judged by a control section inside an electric device box 34 and is used for control. A humidity sensor 35 is provided, and the value detected by this sensor 35 is judged by the judgment section and is used for control. Reference numeral 36 denotes a power supply cable, and reference numeral 37 denotes a terminal board to which signal lines connecting the terminal board of the outdoor unit 1 is connected.

Figure 3:
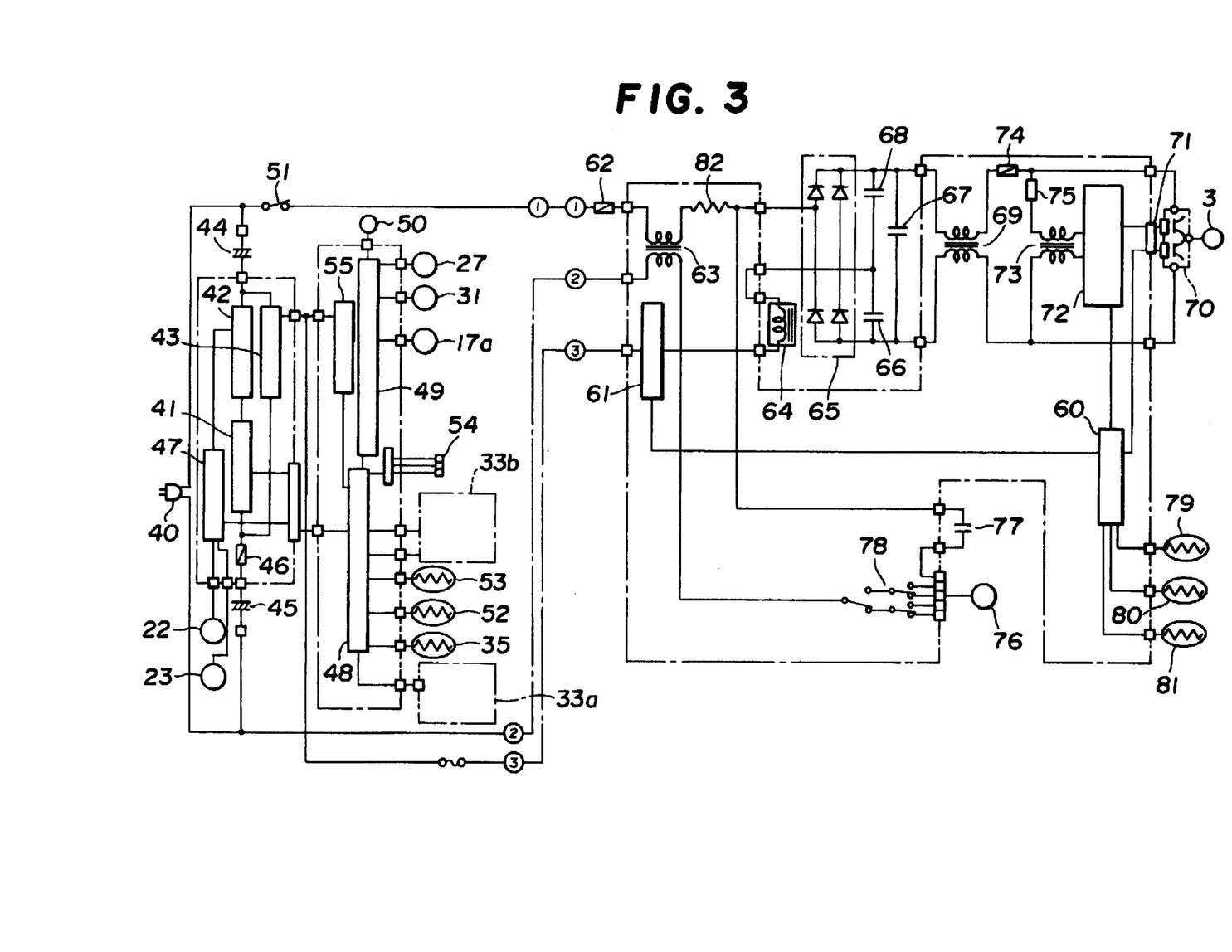
FIG. 3 is a schematic view of a controller used for the air-conditioner shown in FIGS. 1 and 2.

FIG. 3 is a schematic circuit diagram of the controller used for the air conditioner shown in FIG. 2. The controller comprises a control section (the lower side in FIG. 3) disposed on the outdoor unit 1 and a control section (the upper portion in FIG. 3) disposed on the room unit 2. Both of the control sections are electrically connected with each other by the signal lines and the power line between the terminal 1, the terminal 2 and the terminal 3, and can supply power and exchange the signals between them.

On the upper side of FIG. 3 (the control section of the room unit 2), a plug 40 is plugged into an A.C. 100 V outlet of a room and receives the supply of A.C. power. A power supply 41 for a control circuit, a power supply 42 for driving the motors and a power supply 43 for serial communication, are connected to the A.C. power supply through ferrite cores 44 and 45 for noise absorption and a current fuse (3A rating) 46.

A driving circuit 47 controls the supply of power from the motor power supply 42 to the fan motors 22 and 23 according to the signal from a microcomputer 48. When a D.C. motor 1s used for the fan motor, the control method of the fan motors 22 and 23 by the microcomputer 48 comprises chopping D.C. power obtained from the motor power supply 42 and changing an equivalent D.C. voltage applied to the fan motors by the driving circuit 47 so as to control the number of revolutions of the fan motor. When the fan motor is of a brushless type, the driving circuit 47 includes a switch circuit for automatically switching a stator winding for supply power, in accordance to the rotational position of the rotor of the fan motor, and when it is necessary to execute a predetermined arithmetic operation, to detect the rotational position of the rotor, this calculation is performed by the microcomputer 48.

When an induction motor (A.C. motor) is used for the fan motor, the timing of the power supply phase of A.C. power which is obtained from the motor power supply 42 and the voltage of which is lowered is changed by the driving circuit 47 so as to change the equivalent current applied to the fan motor and thus to control the number of revolutions of the fan motor. At this time, the number of revolutions of the rotor of the fan motor can be detected by using a Hall IC, or the like, and the microcomputer 48 can execute feedback control based on the number of revolutions of the rotor.

The control circuit power supply 41, the motor power supply 42, the power supply 43 for serial communication and the driving circuit 47 are mounted on the same electrical part board. The control circuit power supply 41 stabilizes the power used for driving the electrical devices such as the microcomputer 48, the flap motors 27 and 31 and the variable flowrate valve 17, and the power supply 43 for serial communication stabilizes the power on which signals for serial communication are superposed.

A driving circuit 49 drives the flap motors (step motors) 27 and 31, the step motor 17a for driving the variable flowrate valve 17 and a power relay 50 in accordance with the signal from the microcomputer 48. The power relay 50 is equipped with a normally-open contact piece 51 and when this normally-open contact piece 51 is closed, A.C. power obtained from the plug 40 can be supplied to the outdoor unit 1.

Reference numerals 33a and 33b denote a switch board display board, respectively, that are disposed in the operation section 33.

A temperature sensor 52 for detecting the temperature of the heat exchanger 6 on the utilization side (particularly, the heat radiator 6b) and a temperature sensor 53 for detecting the room temperature (the temperature of the room to be air conditioned) are provided. These sensors are connected to the A/D (analog/digital) input terminals of the microcomputer 48 like the humidity sensor 35. The microcomputer 48 converts the analog signals from the sensors to digital values and inputs them for control.

A signal output section 54 outputs control signals to a boiler for circulating hot water through the room hot water supply circuit or to a system having such a boiler. The control signals are outputted when it becomes necessary to circulate hot water through the heat radiator 6b of the room unit 2. A signal for supplying hot water at 60° C. and a signal for supplying hot water at 80° C. can be received in the case of a boiler, and a control signal from the boiler side (such as a trial operation signal) in addition to the signals described above can be received in the case of a system having a boiler.

A serial circuit 55 includes a circuit for superposing the serial signal outputted from the microcomputer 48 between the signal line and one of the lines of the power supply through a photo-coupler and outputting it to the outdoor unit 1, and a circuit for taking out the signal superposed on the signal line through the photo-coupler and transmitting it to the microcomputer 48.

Next, on the lower side (control section of the outdoor unit 1) of FIG. 3, there is provided a microcomputer 60 which receives the signal outputted from the room unit 2 through a serial circuit 61. This serial circuit 61 has the same circuit construction as that of the serial circuit 55 mounted to the room unit 2, and when both of these serial circuits 55 and 61 are used, the microcomputer 48 of the room unit 2 and the microcomputer 60 of the outdoor unit 1 can exchange the control signals.

Through a current fuse 62 (rated current 25A), A.C. power is supplied from the room unit 2. This power is supplied to a diode bridge 65 for full wave rectification through a noise filter 63 and a reactor 64. The diode bridge 65 executes voltage doubling rectification of 100 V A.C. power in cooperation with smoothing capacitors 66, 67 and 68 and obtains 280 V D.C. power. This power is supplied to an inverter circuit 70 formed by connecting six switching devices in a three-phase bridge form, is converted to a three-phase pseudo-sine wave by the inverter circuit 70 and is thereafter supplied to the driving source (induction motor) of the compressor 3.

In order to generate the three-phase pseudo-sine wave having an arbitrary frequency, the microcomputer 60 outputs the switching signal to each switching device of the inverter circuit 70 through a drive circuit 71, and the arbitrary frequency is determined on the basis of the control signal sent from the room unit 2.

Accordingly, A.C. power having its center at D.C. 140 V and having controlled frequency and amplitude is supplied to the induction motor of the compressor 3.

A switching power supply 72 switches voltage-doubled and rectified D.C. power of 280 V obtained through the noise filter 73 and generates stabilized D.C. power for the driving circuit 70 and for the microcomputer 60. Incidentally, reference numeral 74 denotes a current fuse (rating 10 A) and reference numeral 75 denotes a current fuse (rating 3A).

A fan motor 76 drives a propeller fan for supplying heat source air to the heat exchanger on the heat source side. This fan motor 76 is a single-phase induction motor having a capacitor 77 for operation, and can change the number of revolutions of the propeller fan, that is, its blow quantity, into four steps, i.e. stop, weak blow, medium blow and strong blow, by a combination of relay contact pieces 78. The open/close state of the relay contact pieces 78 is switched when the microcomputer 60 controls the supply of power to the relay, not shown in the drawings.

An outdoor air temperature sensor 79 for detecting the temperature of the outdoor air, a coil temperature sensor 80 for detecting the temperature of the heat exchanger on the heat source side and a compressor temperature sensor 81 for detecting the temperature of the compressor 3 are provided, and the respective detection values are converted to digital data, are inputted to the microcomputer 60 and are utilized for control.

A current transformer 82 for detecting an A.C. current mainly detects the A.C. current supplied to the compressor 3. The current value so detected is converted to digital data, then converted to the microcomputer 60, and utilized for control.

In the controller having the construction described above, first, the basic operation of the cooling operation, is as follows. The flow rate control valve 17 is closed, and the microcomputer 48 executes a fuzzy operation on the basis of the room temperature of the room to be air-conditioned and the set temperature, then determines the increment/decrement of the capacity of the compressor 3 and sends the data representing this increment/decrement as control data to the microcomputer 60 of the outdoor unit 1. During a dehumidification operation, the room temperature is lowered near to the set temperature, and a signal of hot water discharge (the hot water discharge temperature is increased when the load is heavy) is sent to the boiler or to the system of the boiler in addition to the above-mentioned control, and opening of the flow rate regulating valve 17 is controlled so that the temperature of the air returned to the room to be air-conditioned does not much differ from the temperature of sucked air.

The basic operation during the heating operation is as follows. The normally-closed contact 51 of the room unit 2 is opened, the supply of power to the outdoor unit 1 is stopped and the operation of the compressor 3 is stopped, too. The microcomputer 48 then executes a fuzzy operation on the basis of the room temperature of the room to be air-conditioned and the set temperature, controls the opening of the flow rate regulating valve 17 and at the same time, sends the signal of hot water discharge (the hot water discharge temperature is increased when the load is heavy) to the boiler or the system of the boiler.

Figure 4:
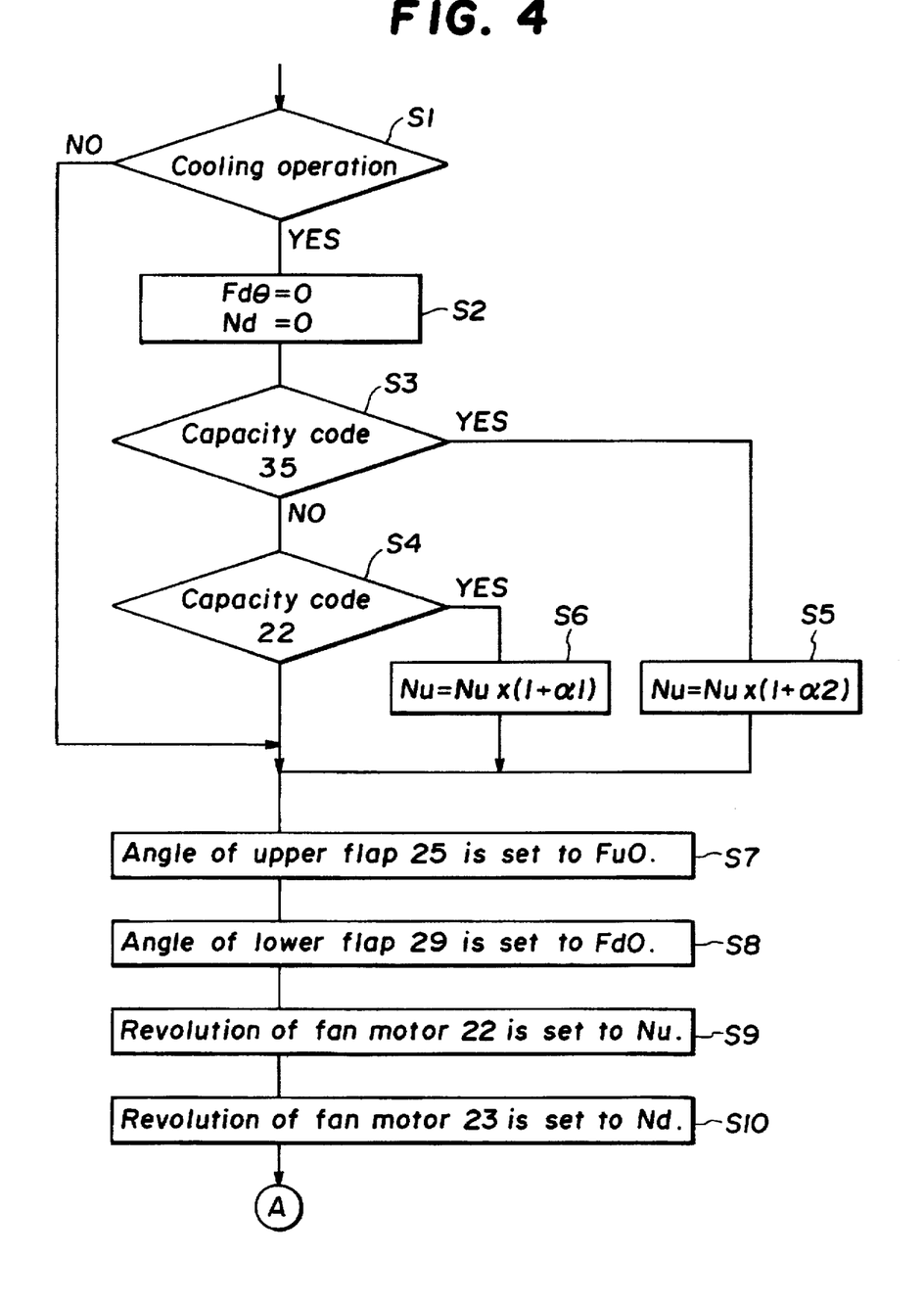
FIG. 4 is a diagram showing the control of flaps and fans by the controller shown in FIG. 3.

FIG. 4 is a flowchart showing the control of the flaps 25 and 29 and the fan motors 22 and 23 by the controller according to the present invention. This flowchart represents the operation executed by the microcomputer 48, only illustrates the functions of the cooling operation and is a part of the flowchart of the overall control.

First, assume that the air conditioner normally operates before the step S1 is carried out. The angles of the upper flap 25 and the lower flap 29 are set to the manual setting state or to the automatic swing state by the setting of the operation section. Accordingly, the values $Fu\theta$ and $Fd\theta$ representing the angles of the upper flap 25 and the lower flap 29 are set. These values automatically change at the time of swing. Incidentally, swing setting of the lower flap 29 cannot be done.

The numbers of revolution Nu and Nd of the fan motor 22 (corresponding to the upper flap 25) and the fan motor 23 (corresponding to the lower flap 29) are similarly set. In case of automatic setting, the numbers of revolution are changed by a predetermined linear function based on the difference between the room temperature and the set temperature.

At the step S1, whether or not the operation is the cooling operation is judged and if this condition is not satisfied, the flow proceeds to the step S7 and to the step S10, where the angle of the upper flap 25 is controlled to $Fu\theta$, the angle of the lower flap is controlled to $Fd\theta$, the number of revolutions of the (upper) fan motor 22 is controlled to Nu and the number of revolutions of the (lower) fan motor 23 is controlled to Nd. The control then proceeds to the next step. The angle of each flap is proportional to the number of pulses given to the respective step motor, and the angle "0" corresponds to the fully closed state (where the blow port is closed). The microcomputer 48 executes positioning of each flap (continuously outputs the pulses until the angle reaches "0"; if the angle resolution is 480, for example, 480 pulses are outputted). Then, the microcomputer 48 stores the number of pulses outputted, correlating the number with the angle and controls the flap angle. Incidentally, the number of revolutions of each fan motor can be set to an arbitrary number of revolutions by executing feedback control.

When the condition of the step S1 is satisfied, the angle $Fd\theta$ of the lower flap is changed to $Fd\theta=0$ and the number of revolutions Nd of the fan motor 23 is changed to Nd=0 at the step S2.

At the subsequent steps S3 and S4, the capacity code of this air conditioner (corresponding to the maximum output capacity of the compressor 3) is judged and the control then proceeds to the step S5 or to the steps S6 and S7. At the step S5, the number of revolutions Nu of the fan motor 22 which is currently set is changed to Nu=Nu×(1+α2) while the number of revolutions of the fan motor 22 which is currently set is changed to Nu=Nu×(1+α1) at the step S6. The constants α1 and α2 have the relation α1>α2, and α1=0.1 and α2=0.05, for example.

Next, the control proceeds to the step S7 to the step S10, and the angles of the flaps and the numbers of revolution of the fan motors are controlled to $Fu\theta$, $Fd\theta(=0)$ and Nu, Nd (=0), respectively. At this time, the lower flap 29 is closed, the fan motor 23 is at halt, and the number of revolutions of the fan motor 22 increases by (1+α1) times or (1+α2) times in comparison with the operations other than the cooling operation.

Figure 5:
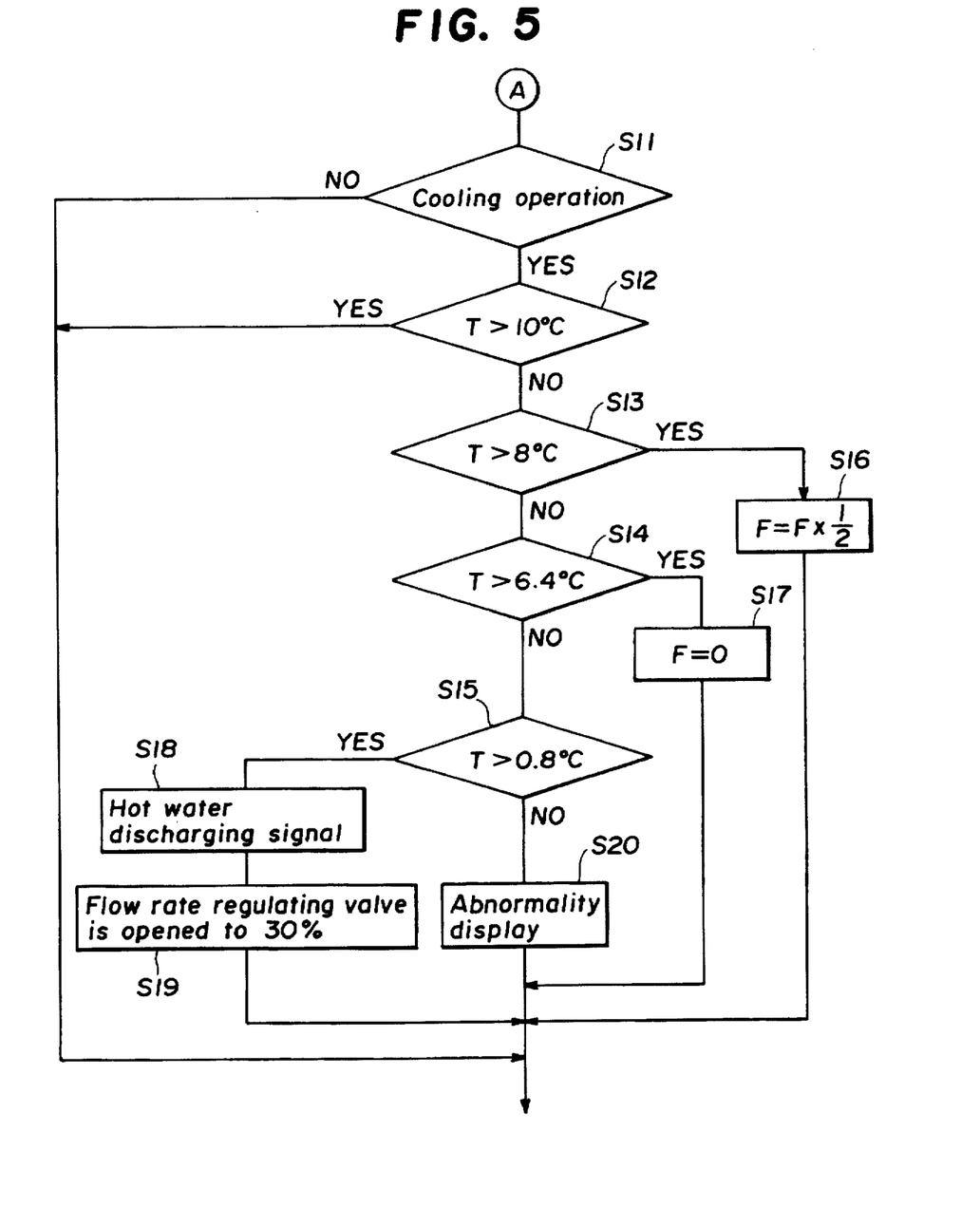
FIG. 5 is a diagram linked to "A" of FIG. 4.

FIG. 5 is a flowchart linked to "A" of FIG. 4. First, whether or not the operation is the cooling operation is judged at the step S11, and when it is the cooling operation, within which zones the temperature T of the heat radiator 6b of the heat exchanger 6 on the utilization side falls is judged on the basis of the judgment of the step S12 to the step S15, and the control then proceeds to the corresponding step.

When the temperature T is T>10° C. (when the step S12 is satisfied), judgment is made as control, and nothing is done.

When the temperature T is 10° C.≧T>8° C., the control proceeds to the step S16, where the signal for changing the frequency F of A.C. power currently supplied to the induction motor of the compressor 3 to F=F×½ is transmitted to the microcomputer 60 of the outdoor unit 1. When this step S16 is executed, the frequency of A.C. power supplied to the compressor 3 is corrected to ½, the cooling capacity of the evaporator 6a drops and a further drop of the temperature T can be prevented.

When the temperature T is 8° C.≧T>6.4° C., the control proceeds to the step S17, and the signal for changing the frequency of A.C. power currently supplied to the induction motor of the compressor 3 to F=0 is transmitted to the microcomputer 60 of the outdoor unit 1. When this step S17 is executed, the frequency of A.C. power currently supplied to the compressor 3 is controlled so that it decreases stepwise to 0 (stop) (the frequency F is decreased at intervals of 10 Hz/min, for example). While the condition of this step S17 is satisfied, cooling of the evaporator 6a stops.

When the temperature T is 6.4° C.≧T>0.8° C., the control proceeds to the step S18 and the step S19, where the signal for discharging hot water to the boiler or to the boiler system is first outputted and then the opening of the flow rate regulating valve 17 is opened to about 30% of the full opening. When these steps are executed, hot water is supplied to the heat radiator 6b of the heat exchanger 6 on the utilization side, and the temperature T can be raised. At this time, the frequency of A.C. power supplied to the compressor 3 remains corrected at 0 (stop) at the step S17.

When the temperature T is 0.8° C.≧T, the control proceeds to the step S20, where abnormality display (display of freezing) is made and then the operation of the air conditioner is stopped.

Accordingly, when this flowchart is executed, the lower flap 29 is closed to close the lower blow port 28 during the cooling operation and the fan motor 23 stops. At the same time, the operation portion 33 sets the wind velocity (the number of revolutions of the fan motor 22) and increases it by 10%. When the temperature T of the heat exchanger 6 on the utilization side further drops, the frequency of A.C. power supplied to the compressor 3 is lowered in accordance with the temperature T or hot water is circulated through the heat radiator 6b so as to compulsorily raise the temperature T of the heat exchanger 6 on the utilization side.

Figure 6:
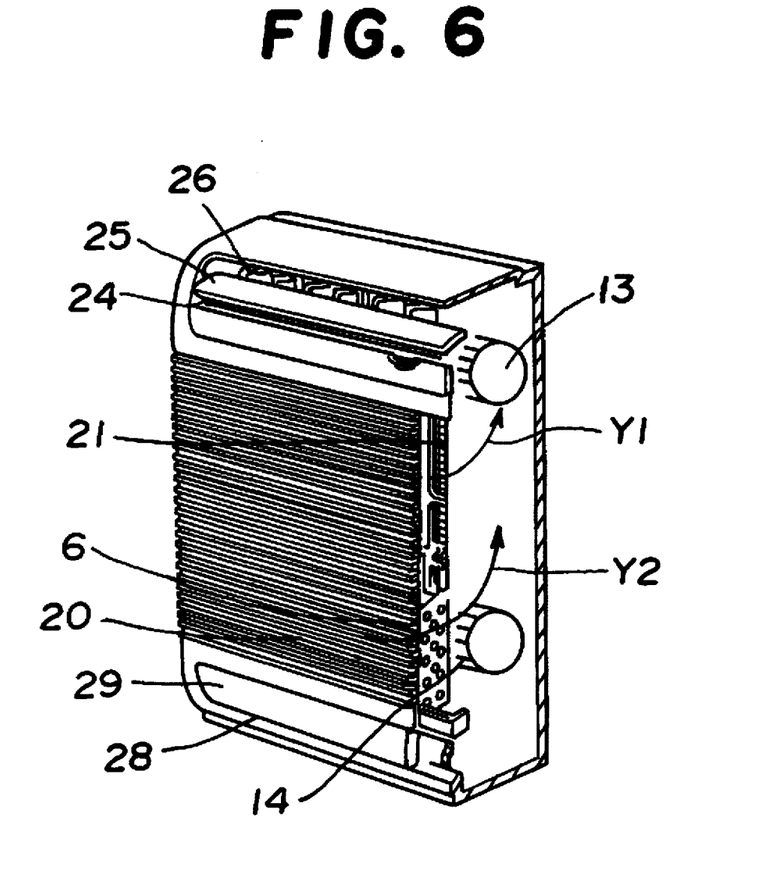
FIG. 6 is an explanatory view showing the flow of air during a cooling operation.

FIG. 6 is an explanatory view showing the flow of wind during the cooling operation. While the blowing fan 14 stops and the lower flap 29 is closed and when the blowing fan 13 is rotated in this state, room air sucked from the suction panel 20 passes through the air filler 21 and the heat exchanger 6 on the utilization side as indicated by arrows Y1 and Y2 of solid lines, is cooled and thereafter returned to the room to be air-conditioned from the upper blow port 24.

At this time, since the blowing fan 13 is disposed on one of the sides of the heat exchanger on the utilization side, the flow rate of air indicated by the solid line arrow Y1 is different from that indicated by the solid line arrow Y2, and the flow rate becomes greater toward the blowing fan 13. Therefore, the flow rate of air has the relation Y1>Y2.

The present invention can increase the flow rate Y2 of air to the flow rate at which the heat exchanger 6 on the utilization side is not frozen.

In the embodiment described above, the heat radiator is provided through which hot water flows. However, because freezing occurs in the evaporator, too, the present invention can be applied when the heat exchanger on the utilization side which has only the evaporator is used also.

As described above, in the first aspect of the invention the air-conditioner includes at least a refrigeration cycle formed by connecting in a loop a compressor of a variable capacity type, a heat exchanger on the heat source side, an expansion device and a heat exchanger on the utilization side by a refrigeration piping and a heat radiator integrally constituted on one of the surfaces of the heat exchanger on the utilization side, for circulating hot water therethrough. The controller of the air-conditioner of the present invention comprises a first blowing fan so disposed on one of the sides as to oppose the same surface of the heat exchanger on the utilization side and a second blowing fan so disposed on the other side as to oppose the same surface; a first blow port and a second blow port for returning air heat-exchanged by the heat exchanger on the utilization side to a room to be air-conditioned, disposed in such a manner as to correspond to the blowing fans, respectively; a flap for closing the blow port; and control means for increasing the blow quantity of the second blowing fan when the flap closes the first blow port, to a value greater than the blow quantity of the second blowing fan when the flap does not close the first blow port, while the set blow quantity is the same; whereby this controller prevents freezing resulting from the drop of the blow quantity by increasing the blow quantity of the blowing fan.

In the second aspect of the invention, the air-conditioner includes at least a refrigeration cycle formed by connecting in a loop a compressor of a variable capacity type, a heat exchanger on the heat source side, an expansion device and a heat exchanger on the utilization side by a refrigeration piping and a heat radiator integrally constituted on one of the surfaces of the heat exchanger on the utilization side, for circulating hot water therethrough. The controller of the air-conditioner comprises a first blowing fan so disposed on one of the sides as to oppose the same surface of the heat exchanger on the utilization side and a second blowing fan so disposed on the other side as to oppose the same surface; a first blow port and a second blow port for returning air heat-exchanged by the heat exchanger on the utilization side to a room to be air-conditioned, disposed in such a manner as to correspond to the blowing fans, respectively; a flap for closing the first blow port; and control means comprising fan control means for controlling the blow quantity of the second blowing fan when the flap closes the first blow port, to a value greater than the blow quantity of the second blowing fan when the flap does not close the first blow port, while the set blow quantity is the same, and capacity regulation means for reducing the capacity of the compressor when the temperature of the heat radiator falls below a predetermined temperature; whereby this controller prevents freezing due to the drop of the blow quantity by increasing the blow, quantity of the blowing fan, and prevents freezing by lowering the operation capacity of the compressor when the temperature of the heat radiator drops.

In the third aspect of the invention, the air-conditioner includes at least a refrigeration cycle formed by connecting in a loop a compressor of a variable capacity type, a heat exchanger on the heat source side, an expansion device and a heat exchanger on the utilization side by a refrigeration piping and a heat radiator integrally constituted on one of the surfaces of the heat exchanger on the utilization side, for circulating hot water therethrough, the controller of the air-conditioner comprises a first blowing fan so disposed on one of the sides as to oppose the same surface of the heat exchanger on the utilization side and a second blowing fan so disposed on the other side as to oppose the same surface; a first blow port and a second blow port for returning air heat-exchanged by the heat exchanger on the utilization side to a room to be air-conditioned, disposed in such a manner as to correspond to the blowing fans, respectively; a flap for closing the first blow port; and control means comprising fan control means for controlling the blow quantity of the second blowing fan when the flap closes the first blow port, to a value greater than the blow quantity of the second blowing fan when the flap does not close the first blow port, while the set blow quantity is the same, capacity regulation means for reducing the capacity of the compressor when the temperature of the heat radiator falls below a predetermined temperature, and hot water control means for controlling the flow of hot water in a direction in which the temperature of the heat radiator rises, when the temperature of the heat radiator falls below a second temperature lower than a predetermined first temperature; whereby this controller prevents freezing resulting from the drop of the blow quantity by increasing the blow quantity of the blowing fan, prevents freezing when the temperature of the heat radiator drops, by lowering the operation capacity of the compressor, and prevents freezing by permitting hot water to flow through the heat radiator when the temperature of the heat radiator further drops.

In the fourth aspect of the invention, the air-conditioner includes at least a refrigeration cycle formed by connecting in a loop a compressor of a variable capacity type, a heat exchanger on the heat source side, an expansion device and a heat exchanger on the utilization side by a refrigeration piping. The controller of the air-conditioner comprises a first blowing fan so disposed on one of the sides as to oppose the same surface of the heat exchanger on the utilization side and a second blowing fan so disposed on the other side as to oppose the same surface; a first blow port and a second blow port for returning air heat-exchanged by the heat exchanger on the utilization side to a room to be air-conditioned, disposed in such a manner as to correspond to the blowing fans, respectively; a flap for closing the first blow port; and control means for controlling the blow quantity of the second blowing fan when the flap closes the first blow port, to a value greater blow quantity than the blow quantity of the second blowing fan when the flap does not close the first blow port, while the set blow quantity is the same; whereby this controller prevents freezing resulting from the drop of the blow quantity by increasing the blow quantity of the blowing fan.

In the fifth aspect of the invention, the air-conditioner includes at least a refrigeration cycle formed by connecting in a loop a compressor of a variable capacity type, a heat exchanger on the heat source side, an expansion device and a heat exchanger on the utilization side by a refrigeration piping, the controller of the air-conditioner comprises a first blowing fan so disposed on one of the sides as to oppose the same surface of the heat exchanger on the utilization side and a second blowing fan so disposed on the other side as to oppose the same surface; a first blow port and a second blow port for returning air heat-exchanged by the heat exchanger on the utilization side to a room to be air-conditioned, disposed in such a manner as to correspond to the blowing fans, respectively; a flap for closing the first blow port; and control means comprising fan control means for controlling the blow quantity of the second blowing fan when the flap closes the first blow port, to a value greater than the blow quantity of the second blowing fan when the flap does not close the blow port, while the set blow quantity is the same, and capacity regulation means for reducing the capacity of the compressor when the temperature of the heat exchanger on the utilization side falls below a predetermined temperature. In other words, this controller prevents freezing resulting from the drop of the blow quantity by increasing the blow quantity of the blowing fan, and prevents freezing when the temperature of the heat radiator drops, by lowering the operation capacity of the compressor.

In the sixth aspect of the invention, the air-conditioner including at least a refrigeration cycle formed by connecting in a loop a compressor of a variable capacity type, a heat exchanger on the heat source side, an expansion device and a heat exchanger on the utilization side by a refrigeration piping. The controller of the air-conditioner comprises a first blowing fan so disposed on one of the sides as to oppose the same surface of the heat exchanger on the utilization side and a second blowing fan so disposed on the other side as to oppose the same surface; a first blow port and a second blow port for returning air heat-exchanged by the heat exchanger on the utilization side to a room to be air-conditioned, disposed in such a manner as to correspond to the blowing fans, respectively; and control means comprising fan control means for controlling the blow quantity of the second blowing fan when the first blowing fan does not operate, to a value greater than the blow quantity of the second blowing fan, when the first blowing fan operates, while the set blow quantity is the same, and capacity regulation means for reducing the capacity of the compressor when the temperature of the heat exchanger on the utilization side falls below a predetermined temperature; whereby this controller prevents freezing resulting from the drop of the blow quantity by increasing the blow quantity of the blowing fan.

What is claimed is:

1. In an air-conditioner including at least a refrigeration cycle formed by connecting in a loop a compressor of a variable capacity type, a heat exchanger on the heat source side, an expansion device and a heat exchanger on the utilization side by a refrigeration piping, and a heat radiator integrally constituted on one of the surfaces of said heat exchanger on the utilization side, for circulating hot water therethrough, a controller of said air-conditioner comprising:

a first blowing fan so disposed on one of the sides as to oppose the same surface of said heat exchanger on the utilization side and a second blowing fan so disposed on the other side as to oppose said same surface;

a first blow port and a second blow port for returning air heat-exchanged by said heat exchanger on the utilization side to a room to be air-conditioned, disposed in such a manner as to correspond to said blowing fans, respectively;

a flap for closing said first blow port; and control means for increasing the blow quantity of said second blowing fan when said flap closes said first blow port, to a value greater than the blow quantity of said second blowing fan when said flap does not close said first blow port, while the set blow quantity is the same.

2. In an air-conditioner including at least a refrigeration cycle formed by connecting in a loop a compressor of a variable capacity type, a heat exchanger on the heat source side, an expansion device and a heat exchanger on the utilization side by a refrigeration piping, and a heat radiator integrally constituted on one of the surfaces of said heat exchanger on the utilization side, for circulating hot water therethrough, a controller of said air-conditioner comprising:

a first blowing fan so disposed on one of the sides as to oppose the same surface of said heat exchanger on the utilization side and a second blowing fan so disposed on the other side as to oppose said same surface;

a first blow port and a second blow port for returning air heat-exchanged by said heat exchanger on the utilization side to a room to be air-conditioned, disposed in such a manner as to correspond to said blowing fans, respectively;

a flap for closing said first blow port; and control means comprising blow fan control means for controlling the blow quantity of said second fan when said flap closes said first blow port, to a value greater than the blow quantity of said second blowing fan when said flap does not close said first blow port, while the set blow quantity is the same, and capacity regulation means for reducing the capacity of said compressor when the temperature of said heat radiator falls below a predetermined temperature.

3. In an air-conditioner including at least a refrigeration cycle formed by connecting in a loop a compressor of a variable capacity type, a heat exchanger on the heat source side, an expansion device and a heat exchanger on the utilization side by a refrigeration piping, and a heat radiator integrally constituted on one of the surfaces of said heat exchanger on the utilization side, for circulating hot water therethrough, a controller of said air-conditioner comprising:

a first blowing fan so disposed on one of the sides as to oppose the same surface of said heat exchanger on the utilization side and a second blowing fan so disposed on the other side as to oppose said same surface;

a first blow port and a second blow port for returning air heat-exchanged by said heat exchanger on the utilization side to a room to be air-conditioned, disposed in such a manner as to correspond to said blowing fans, respectively;

a flap for closing said first blow port; and control means comprising fan control means for controlling the blow quantity of said second blowing fan when said flap closes said first blow port, to a value greater than the blow quantity of said second blowing fan when said flap does not close said first blow port, while the set blow quantity is the same, capacity regulation means for reducing the capacity of said compressor when the temperature of said heat radiator falls below a predetermined temperature, and hot water control means for controlling the flow of hot water in a direction in which the temperature of said heat radiator rises, when the temperature of said heat radiator falls below a second temperature lower than a predetermined first temperature.

4. In an air-conditioner including at least a refrigeration cycle formed by connecting in a loop a compressor of a variable capacity type, a heat exchanger on the heat source side, an expansion device and a heat exchanger on the utilization side by a refrigeration piping, a controller of said air-conditioner comprising:

a first blowing fan so disposed on one of the sides as to oppose the same surface of said heat exchanger on the utilization side and a second blowing fan so disposed on the other side as to oppose said same surface;

a first blow port and a second blow port for returning air heat-exchanged by said heat exchanger on the utilization side to a room to be air-conditioned, disposed in such a manner as to correspond to said blowing fans, respectively;

a flap for closing said first blow port; and control means for controlling the blow quantity of said second blowing fan when said flap closes said first blow port, to a value greater than the blow quantity of said second blowing fan when said flap does not close said first blow port, while the set blow quantity is the same.

5. In an air-conditioner including at least a refrigeration cycle formed by connecting in a loop a compressor of a variable capacity type, a heat exchanger on the heat source side, an expansion device and a heat exchanger on the utilization side by a refrigeration piping, a controller of said air-conditioner comprising:

a first blowing fan so disposed on one of the sides as to oppose the same surface of said heat exchanger on the utilization side and a second blowing fan so disposed on the other side as to oppose said same surface;

a first blow port and a second blow port for returning air heat-exchanged by said heat exchanger on the utilization side to a room to be air-conditioned, disposed in such a manner as to correspond to said blowing fans, respectively;

a flap for closing said first blow port; and control means comprising fan control means for controlling the blow quantity of said second blowing fan when said flap closes said first blow port, to a value greater than said blow quantity of said second blowing fan when said flap does not close said blow port, while the set blow quantity is the same, and capacity regulation means for reducing the capacity of said compressor when the temperature of said heat exchanger on the utilization side falls below a predetermined temperature.

6. In an air-conditioner including at least a refrigeration cycle formed by connecting in a loop a compressor of a variable capacity type, a heat exchanger on the heat source side, an expansion device and a heat exchanger on the utilization side by a refrigeration piping, a controller of said air-conditioner comprising:

a first blowing fan so disposed on one of the sides as to oppose the same surface of said heat exchanger on the utilization side and a second blowing fan so disposed on the other side as to oppose said same surface;

a first blow port and a second blow port for returning air heat-exchanged by said heat exchanger on the utilization side to a room to be air-conditioned, disposed In such a manner as to correspond to said blowing fans, respectively; and control means comprising fan control means for controlling the blow quantity of said second blowing fan when said first blowing fan does not operate, to a value greater than said blow quantity of said second blowing fan when said first blowing fan operates, while the set blow quantity is the same, and capacity regulation means for reducing the capacity of said compressor when the temperature of said heat exchanger on the utilization side falls below a predetermined temperature.

* * * * *